United States Patent Office 3,542,877
Patented Nov. 24, 1970

3,542,877
ACYL SUBSTITUTED 4,7-METHANOINDENES
Morris Dunkel, Paramus, N.J., assignor to Universal Oil Products Company, Des Plaines, Ill., a corporation of Delaware
No Drawing. Filed Jan. 24, 1967, Ser. No. 611,271
Int. Cl. C07c 49/45; C11b 9/00
U.S. Cl. 260—586                                6 Claims

ABSTRACT OF THE DISCLOSURE

Novel acyl substituted 4,7-methanoindenes useful as perfume ingredients prepared by a Rupe-type rearrangement of corresponding hydroxy and acetylenic substituted methanoindenes.

This invention relates to a new class of compounds, to the preparational process therefor and to perfume compositions contaning such compounds as olfactory ingredients. More particularly, this invention relates to novel substituted 4,7-methanoindenes.

The novel 4,7-methanoindenes of this invention may be represented by the following structural formulae:

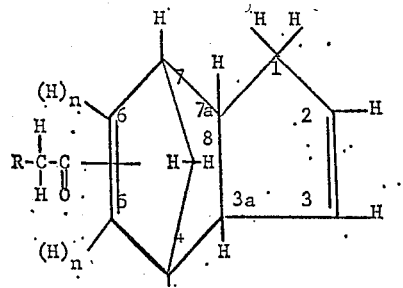

(I)

and

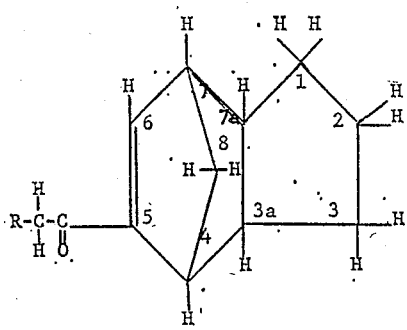

(II)

where R is selected from the group consisting of hydrogen, alkyl, or alkenyl and n is an integer of 0 or 1; provided, that for the carbon atom in the 5 or 6 position which is substituted with the acyl group,

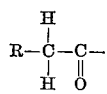

the integer associated therewith is 0 and the other integer is 1. Because of the existence of the double bond in the cyclopentene portion of the tetrahydromethanoindene of this invention illustrated by structure I above, the positions 5 and 6 are not chemically equivalent. Accordingly, when the tetrahydromethanoindene is substituted with the acyl group according to this invention, different isomeric compounds result depending upon whether the substituent is attached to the 5 or 6 positioned carbon atom. The extremely close physical similarity of such isomers, moreover, prevents ready identification and separation of the different isomers from each other and for this reason it is intended that both isomeric compounds as well as mixtures thereof be encompassed within this invention by describing the tetrahydromethanoindene in this specification and appended claims as tetrahydromethanoindene substituted in one of the 5 and 6 positions with the acyl group. No comparable problem exists for the hexahydromethanoindene of this invention illustrated by structure II above, inasmuch as there is no double bond in the cyclopentane portion of the molecule and the positions 5 and 6 are accordingly chemically equivalent. For this reason, the hexahydromethanoindene is described in this specification and appended claims as being substituted with the acyl group in the 5 position. Both the tetrahydro- and hexahydromethanoindenes of this invention also exist in the exo and endo forms and it is intended that all of these isomeric compounds be encompassed within this invention.

The novel 4,7-methanoindenes of this invention find wide utility in the chemical field and are especially useful as plasticizers, ingredients of synthetic waxes and resins, perfume materials or as intermediates for drugs and insecticides. Of these many applications, however, one of the more valuable present uses for these compounds is in perfumery due to their highly pleasant odorous nature. Of considerable significance in this respect is that certain of these compounds, and particularly one of the hexahydromethanoindenes, namely 5-acetyl-2,3,3a,4,7,7a-hexahydro-4,7-methanoindene, possesses a strong woody odor which has important application in perfumery.

Accordingly, it is an object of this invention to provide a new class of compounds consisting of 4,7-methanoindenes having a specific acyl substituent at one of the 5 and 6 positions. Another object is to provide a preparational process for these 4,7-methanoindenes. Still another object of this invention is to provide perfume compositions containing these novel 4,7-methanoindenes as olfactory ingredients. Other objects of this invention will become apparent from the following further detailed description thereof.

The 4,7-methanoindenes of this invention having the structures I and II above are preparing according to the process of this invetnion by treating corresponding hydroxy and acetylenic substituted methanoindenes under Rupe-type conditions to effect intramolecular rearrangement. These corresponding or precursor methanoindenes have the same base structures represented by structures I and II above except that there is no double bond in the 5–6 position and instead of the acyl substituent, they are substituted in one of the 5 or 6 positions, both with hydroxy and with an acetylenic group, R—C≡C—, where R has the same significance as above and when R is alkyl or alkenyl, preferably alkyl or alkenyl containing from 1 to about 5 carbon atoms. The Rupe-type rearrangement of the preparational process of this invention may be illustrated in preparing a hexahydromethanoindene represented by structure II above as follows, using as the precursor an octahydromethanoindene substituted in the 5 position with the hydroxy and acetylenic groups.

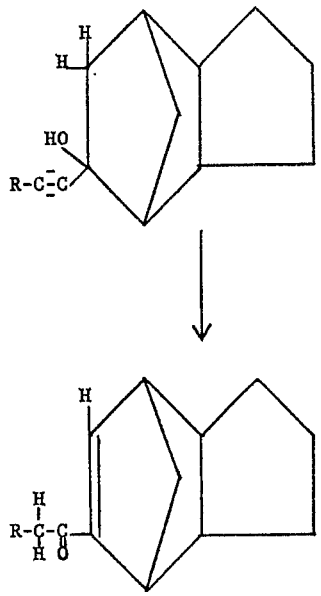

The preparation of the tetrahydromethanoindene, represented by structure I above, will proceed according to the same rearrangement except that the starting material will comprise a hexahydromethanoindene substituted in one of the 5 and 6 positions with the hydroxy and acetylenic groups.

The 4,7-methanoindenes substituted in one of the 5 and 6 positions with hydroxy and an acetylenic radical which are used in the rearrangement reaction of this invention may be obtained by several different preparational methods. One method involves reacting a corresponding methanoindenyl ketone with an appropriate metal acetylide to obtain a reaction product which may be decomposed with water to form, for example, 5-ethynyl-5-hydroxy-2,3,3a,4,5,6,7,7a-octahydro-4,7-methanoindene. Examples of the hydroxy and acetylenic substituted methanoindenes which may be used in the rearrangement to prepare the compounds of this invention include octahydromethanoindenes such as 5-ethynyl-5-hydroxy-2,3,3a,4,5,6,7,7a-octahydro-4,7-methanoindene; 5-propynyl-5-hydroxy-2,3,3a,4,5,6,7,7a-octahydro-4,7-methanoindene; 5-butynyl-5-hydroxy-2,3,3a,4,5,6,7,7a-octahydro-4,7-methanoindene or 5-(1-buten-3-ynyl)-5-hydroxy-2,3,3a,4,5,6,7,7a-octahydro-4,7-methanoindene and hexahydromethanoindenes such as 3a,4,5,6,7,7a-hexahydro-4,7-methanoindene substituted in one of the 5 or 6 positions with ethynyl and hydroxy; 3a,4,5,6,7,7a-hexahydro-4,7-methanoindene substituted in one of the 5 or 6 positions with propynyl and hydroxy; 3a,4,5,6,7,7a-hexahydro-4,7-methanoindene substituted in one of the 5 or 6 positions with butynyl and hydroxy; or 3a,4,5,6,7,7a-hexahydro-4,7-methanoindene substituted in one of the 5 or 6 positions with 1-buten-3-ynyl and hydroxy.

The conditions and procedures used to effect the Rupe-type rearrangement of the hydroxy and acetylenic substituted methanoindenes to prepare the compounds of this invention may be widely varied. The rearrangement is usually effected by simply heating the desired methanoindene in the presence of a strong acid such as formic or polyphosphoric for a period of time sufficient to complete the rearrangement. Preferably, the rearrangement is effected in an inert solvent such as an aromatic, for example, benzene or toluene. The temperature used may be varied and usually ranges from about 75° to 150° C. at atmospheric pressure and when a solvent is used, reflux temperature at atmospheric pressure conveniently is used. The time required to effect the rearrangement will vary depending upon the particular methanoindene being rearranged and the rearrangement temperature. Generally, however, the time required is not excessive and it typically ranges from about ½ to 5 hours. When the rearrangement is complete, the desired product may be recovered from the reaction mixture and purified by conventional methods including solvent extraction and distillation. Examples of the compounds of this invention include tetrahydromethanoindenes represented by structure I above such as 3a,4,7,7a-tetrahydro-4,7-methanoindene substituted in one of the 5 or 6 positions with acetyl; 3a,4,7,7a-tetrahydro-4,7-methanoindene substituted in one of the 5 and 6 positions with propionyl; 3a,4,7,7a-tetrahydro-4,7-methanoindene substituted in one of the 5 and 6 positions with butyryl; 3a,4,7,7a-tetrahydro-4,7-methanoindene substituted in one of the 5 and 6 positions with valeryl; or 3a,4,7,7a-tetrahydro-4,7-methanoindene substituted in one of the 5 and 6 positions with capropyl and hexahydromethanoindenes represented by structure II above such as 5-acetyl-2,3,3a,4,7,7a-hexahydro-4,7-methanoindene; 5-propionyl-2,3,3a,4,7,7a-hexahydro-4,7-methanoindene; 5-butyryl-2,3,3a,4,7,7a-hexahydro-4,7-methanoindene; 5-valeryl-2,3,3a,4,7,7a-hexahydro-4,7-methanoindene; or 5-caproyl-2,2,3a,4,7,7a-hexahydro-4,7-methanoindene. As an alternative to the preparational method of this invention described above, the compounds of this invention may be prepared by directly acylating the desired corresponding methanoindene with the desired acid halide or anhydride in the presence of an acylation catalyst.

As hereinbefore indicated the highly pleasant odorous nature of the novel compounds of this invention render them highly valuable as perfume ingredients. For example, 5-acetyl-2,3,3a,4,7,7a-hexahydro-4,7-methanoindene possesses a strong woody odor rendering it highly suitable for creating woody-type perfumes. Accordingly, the compounds of this invention, either individually or in admixture, may be used in perfumes as the olfactory ingredient thereof and thus create novel perfume compositions. As used herein, the term perfume means a mixture of synthetic or naturally derived organic compounds including, for example, alcohols, aldehydes, ethers, ketones, esters, and frequently also hydrocarbons which are combined in fixed proportions so that the odors of the individual compounds combine to produce a harmonious fragrance. In perfumery practice these compounds are combined through the blending of natural oils, gums, resins, animal derivatives, absolutes, natural isolates or synthetic chemicals. The quantity of the novel compounds of this invention utilized in perfumes as the olfactory ingredient thereof may vary within a wide range and depends upon the particular compound used and the particular type of perfume being created or improved. For example, in the preparation of perfumes having woody notes, the quantity of the substituted methanoindene used may range from about 0.01 to 80 percent of the total weight of the perfume with a quantity of about 0.1 to 25 percent by weight being satisfactorily used in many instances.

The perfume compositions of this invention having the substituted 4,7-methanoindenes as olfactory ingredients may be used per se in alcoholic solutions or incorporated into items such as cosmetic creams, soaps, synthetic detergents, talcum powders or other toilet goods such as shampoos to produce products having desirable commercial fragrance properties.

The following examples are given to illustrate the compounds of this invention, the preparational process therefor and perfume compositions containing the compounds as olfactory ingredients. These examples are not, however, intended to limit the generally broad scope of this invention in strict accordance therewith:

EXAMPLE I 5-acetyl - 2,3,3a,4,7,7a - hexahydro-4,7-methanoindene was prepared according to the process of this invention by the following procedure:

A reaction flask containing 2 grams of polyphosphoric acid and 35 milliliters of benzene was heated to reflux temperature and 25 grams of 5-ethynyl-5-hydroxy-2,3,3a, 4,5,6,7,7a-octahydro-4,7-methanoindene was slowly added with vigorous stirring over a period of about 1 hour. After the addition was complete, the mixture was refluxed for another hour and then it was poured into 200 grams of a 5 percent sodium carbonate solution. The resulting organic phase was separated and the aqueous phase extracted with benzene. The organic phases were combined and after water washing were then distilled to recover the product boiling at 109° to 118° C. at 2 mm. Hg and having a refractive index of $n_D^{20}$ 1.5384.

EXAMPLE II 3a,4,7,7a-tetrahydro-4,7-methanoindene substituted in one of the 5 and 6 positions with acetyl is prepared according to the process of this invention by the following procedure:

A reaction flask containing 12 grams of polyphosphoric acid and 185 milliliters of benzene is heated to reflux temperature and 150 grams of 3a,4,5,6,7,7a-hexahydro-4,7-methanoindene substituted in one of the 5 and 6 positions with hydroxy and ethynyl is slowly added with vigorous stirring over a period of about 1 hour. After the addition is complete, the mixture is refluxed for another hour and then it is poured into 200 grams of a 5 percent sodium carbonate solution. The resulting organic phase is separated and the aqueous phase extracted with benzene. The organic phases are combined and after water washing are then distilled to recover the product.

EXAMPLE III 5-butyryl - 2,3,3a,4,7,7a-hexahydro-4,7-methanoindene is prepared according to the process of this invention by the following procedure:

A reaction flask containing 20 grams of polyphosphoric acid and 300 milliliters of benzene is heated to reflux temperature and 210 grams of 5-(1-butynyl)-5-hydroxy-2,3,3a,4,5,6,7,7a-octahydro-4,7-methanoindene is slowly added with vigorous stirring over a period of about 1 hour. After the addition is complete, the mixture is refluxed for another hour and then it is poured into 200 grams of a 5 perecnt sodium carbonate solution. The resulting organic phase is separated and the aqueous phase extracted with benzene. The organic phases are combined and after water washing are then distilled to recover the product.

EXAMPLE IV

A perfume having woody-cedarwood odor notes is prepared using a compound of this invention as an olfactory ingredient by combining the following components in the indicated proportions:

| Component: | Parts by weight |
|---|---|
| 5-acetyl - 2,3,3a,4,7,7a - hexahydro-4,7-methanoindene | 200 |
| Santal | 150 |
| Bromstyroll | 10 |
| Cananga | 100 |
| Terpineol | 100 |
| Methyl ionone | 150 |
| Cedarwood | 250 |
| Geranium, bourbon | 100 |
| Vetivert | 30 |
| Orris resin | 60 |
| Heliotropin | 50 |
| | 1200 |

I claim as my invention:
1. A compound selected from the group consisting of 3a,4,7,7a-tetrahydro-4,7-methanoindene and 2,3,3a,4,7,7a-hexahydro-4,7-methanoindene which is substituted in one of the 5 and 6 positions with an acyl group

$$R-\underset{\underset{H}{|}}{\overset{\overset{H}{|}}{C}}-\underset{\underset{O}{\|}}{C}-$$

where R is hydrogen or alkyl of from 1 to 5 carbon atoms.

2. The compound according to claim 1 characterized in that it is 3a,4,7,7a-tetrahydro-4,7-methanoindene substituted in one of the 5 and 6 positions with the acyl group.

3. The compound according to claim 1 characterized in that it is 2,3,3a,4,7,7a-hexahydro-4,7-methanoindene substituted in the 5 position with the acyl group.

4. The compound according to claim 1 characterized in that it is 5-acetyl-2,3,3a,4,7,7a-hexahydro-4,7-methanoindene.

5. The compound according to claim 1 characterized in that it is 3a,4,7,7a-tetrahydro-4,7-methanoindene substituted in one of the 5 and 6 positions with acetyl.

6. The compound according to claim 1 characterized in that it is 5-butyryl-2,3,3a,4,7,7a-hexahydro-4,7-methanoindene.

References Cited

UNITED STATES PATENTS 3,407,225  10/1968  Dunkel _____ 260—586

OTHER REFERENCES

Krauch et al.: Organic Name Reactions, p. 400.

LEON ZITVER, Primary Examiner

N. P. MORGENSTERN, Assistant Examiner

U.S. Cl. X.R.

252—522